Figure 1:
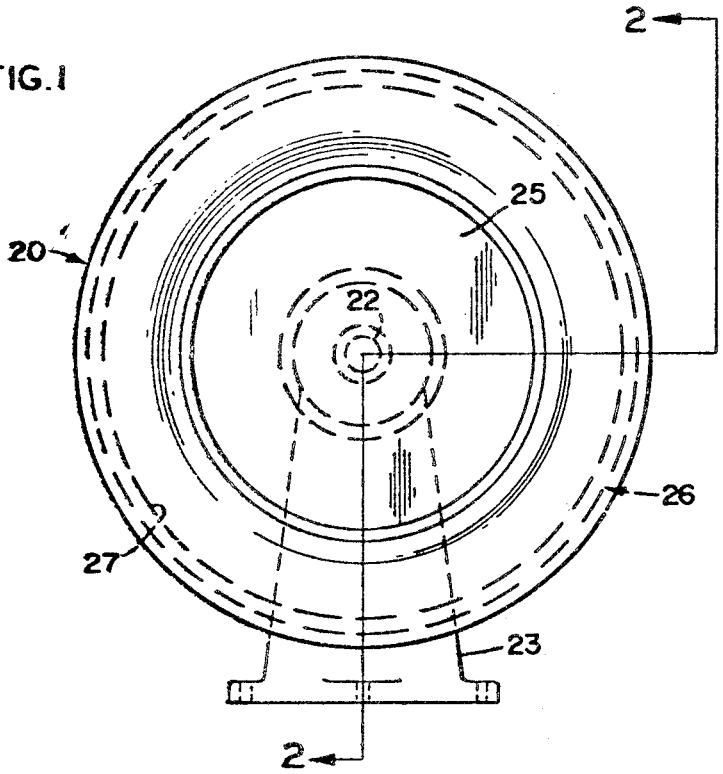
Figure 2:
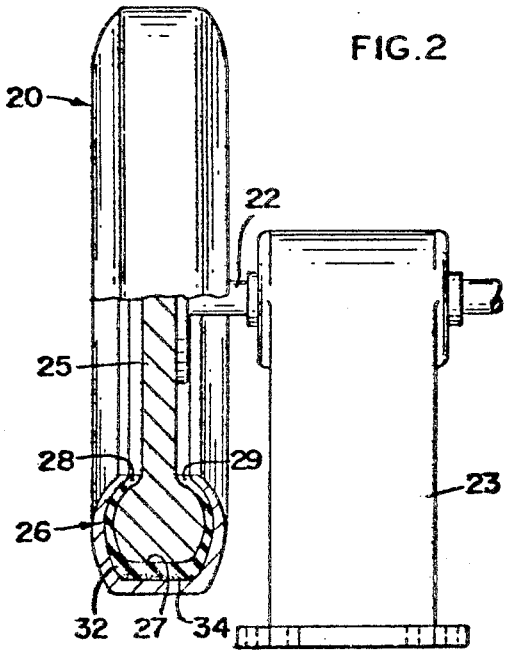

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 6, 1976

948 O.G. 5

T948,001

METHOD OF CENTRIFUGALLY CASTING A COMPOSITE TIRE OR SIMILAR ARTICLE

Floyd Mount Smith, Akron, Ohio, assignor to The Firestone Tire & Rubber Company, Akron, Ohio

Continuation of abandoned application Ser. No. 855,706, Sept. 5, 1969. This application Oct. 26, 1973, Ser. No. 409,840

Int. Cl. B29c *5/04*

U.S. Cl. 264—311

2 Sheets Drawings. 8 Pages Specification

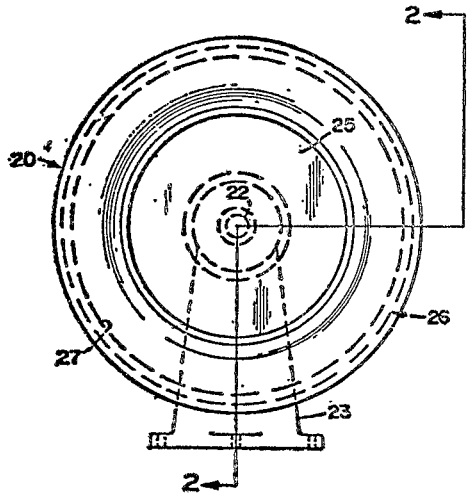

A method of centrifugally casting a composite tire structure by introducing into a rotating mold a curable liquid resin and particles having a greater specific gravity than the resin and the desired physical characteristics for use in a tire tread area. The particles, because of centrifugal force, move outwardly through the resin and position themselves in the tread stock area and the remainder of the tire is formed of the curable liquid resin. The particles are preferably added after the resin however, they may be added before or at the same time as the resin.

METHOD OF CENTRIFUGALLY CASTING A COMPOSITE TIRE OR SIMILAR ARTICLE

Original Filed Oct. 26, 1973

FIG.3
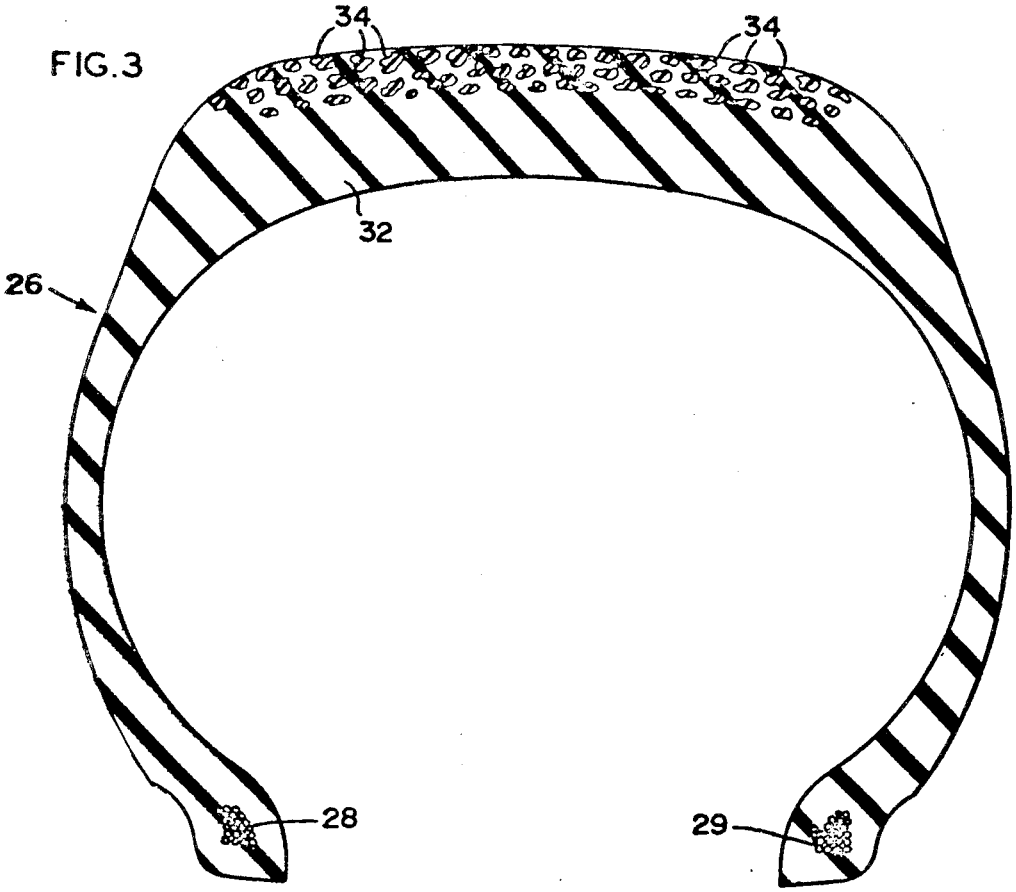
FIG.4
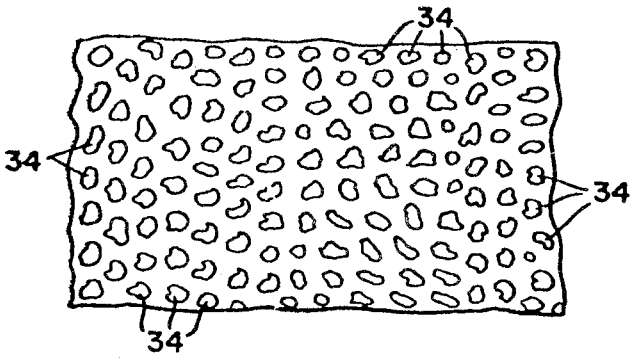
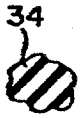
FIG.5
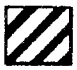
FIG.6
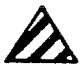
FIG.7